United States Patent [19]

Boateng

[11] Patent Number: 4,976,832
[45] Date of Patent: Dec. 11, 1990

[54] METHOD FOR MAKING ARSENIC ACID

[75] Inventor: Daniel A. D. Boateng, Montrose, Canada

[73] Assignee: Cominco Ltd., Vancouver, Canada

[21] Appl. No.: 433,867

[22] Filed: Nov. 9, 1989

[51] Int. Cl.$^5$ .............................................. C25B 1/22
[52] U.S. Cl. ...................................... 204/98; 204/96; 204/103; 204/101; 204/182.4
[58] Field of Search ............ 204/103, 101, 128, 182.3, 204/182.4, 96, 98

[56] References Cited

U.S. PATENT DOCUMENTS 3,769,230  9/1988  Greco et al. ........................ 423/617
4,372,828  2/1983  Ahn ..................................... 204/103

Primary Examiner—John F. Niebling
Assistant Examiner—Arun S. Phasge
Attorney, Agent, or Firm—Arne I. Fors

[57] ABSTRACT

An arsenate solution is treated by electrolysis with membranes for at least partial conversion into arsenic acid and hydroxide. Electrolysis is carried out in an electrolytic unit containing an arrangement of electrodes and membranes. Depending on the electrode and membrane type and configuration, arsenic acid having a reduced content of alkali metal or ammonium cations and impurities is recovered. Arsenic acid-containing solution and hydroxide solution are removed. An electrolysis unit comprises, preferably, a stack of 2- or 3-compartment cells, comprising at least one electrode/membrane group arranged between terminal electrodes with or without terminal membranes. Each group may comprise a bipolar or a monopolar electrode in combination with either cationic or cationic and anionic membranes. Hydroxide and acid compartments are defined between electrodes and membranes, and diluate compartments may be defined between membranes.

13 Claims, 4 Drawing Sheets

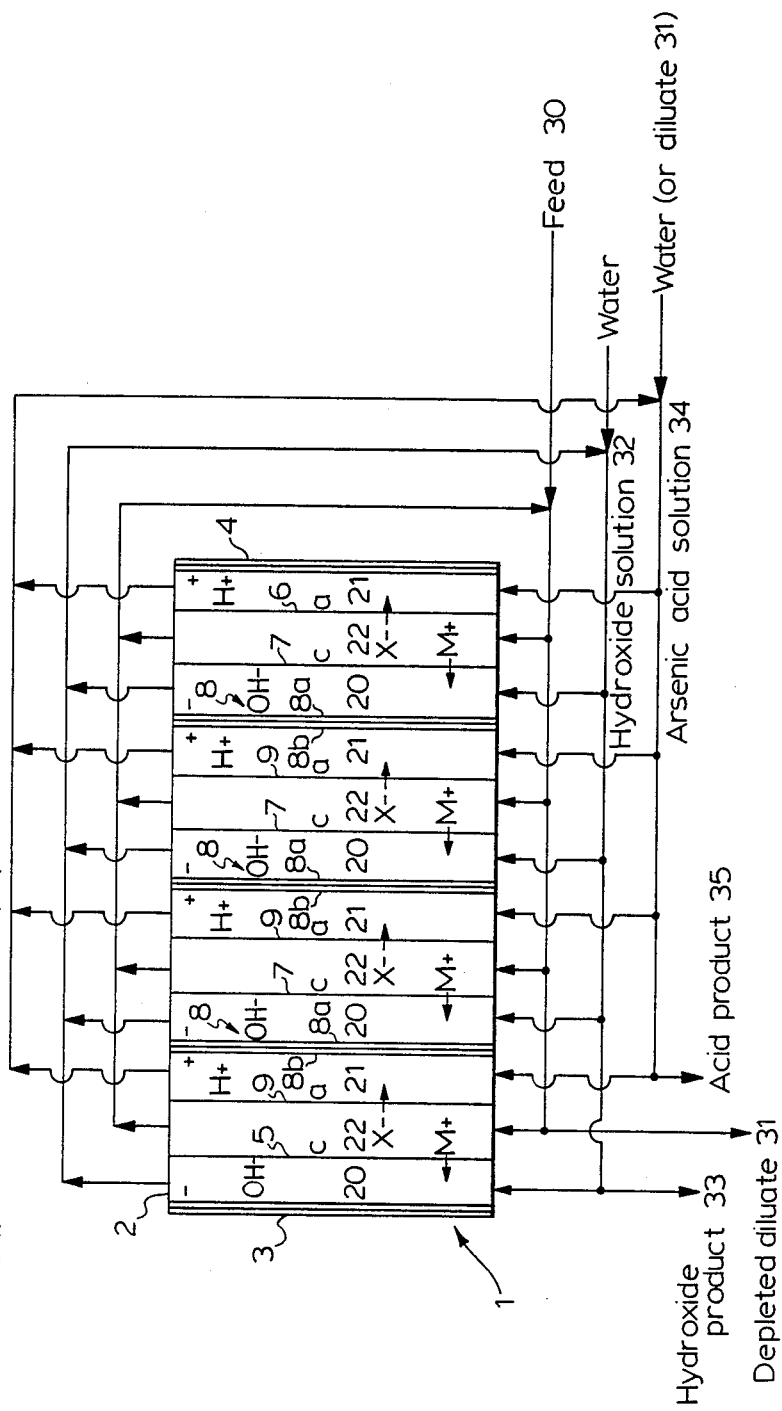

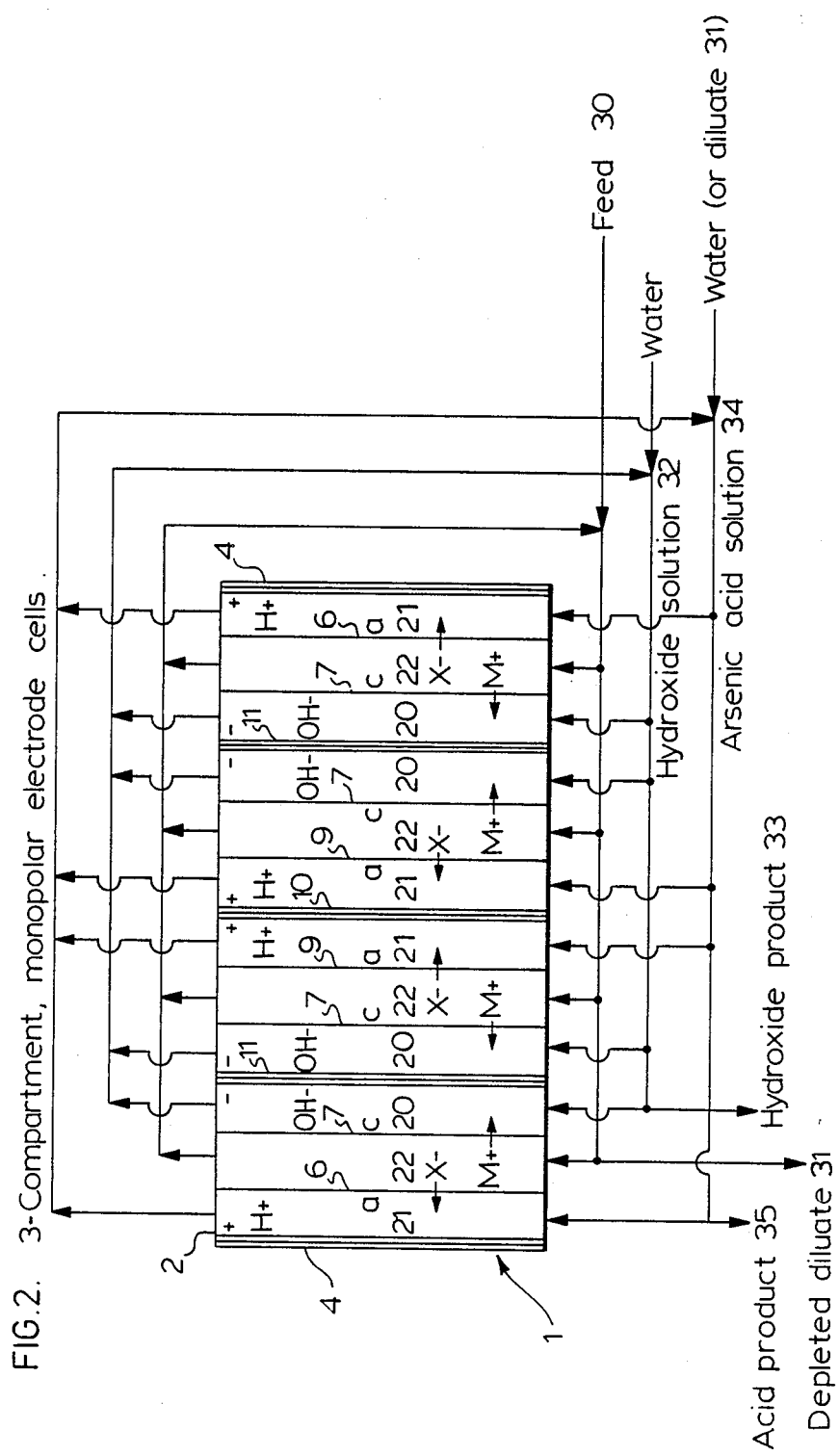
FIG. 2. 3-Compartment, monopolar electrode cells.

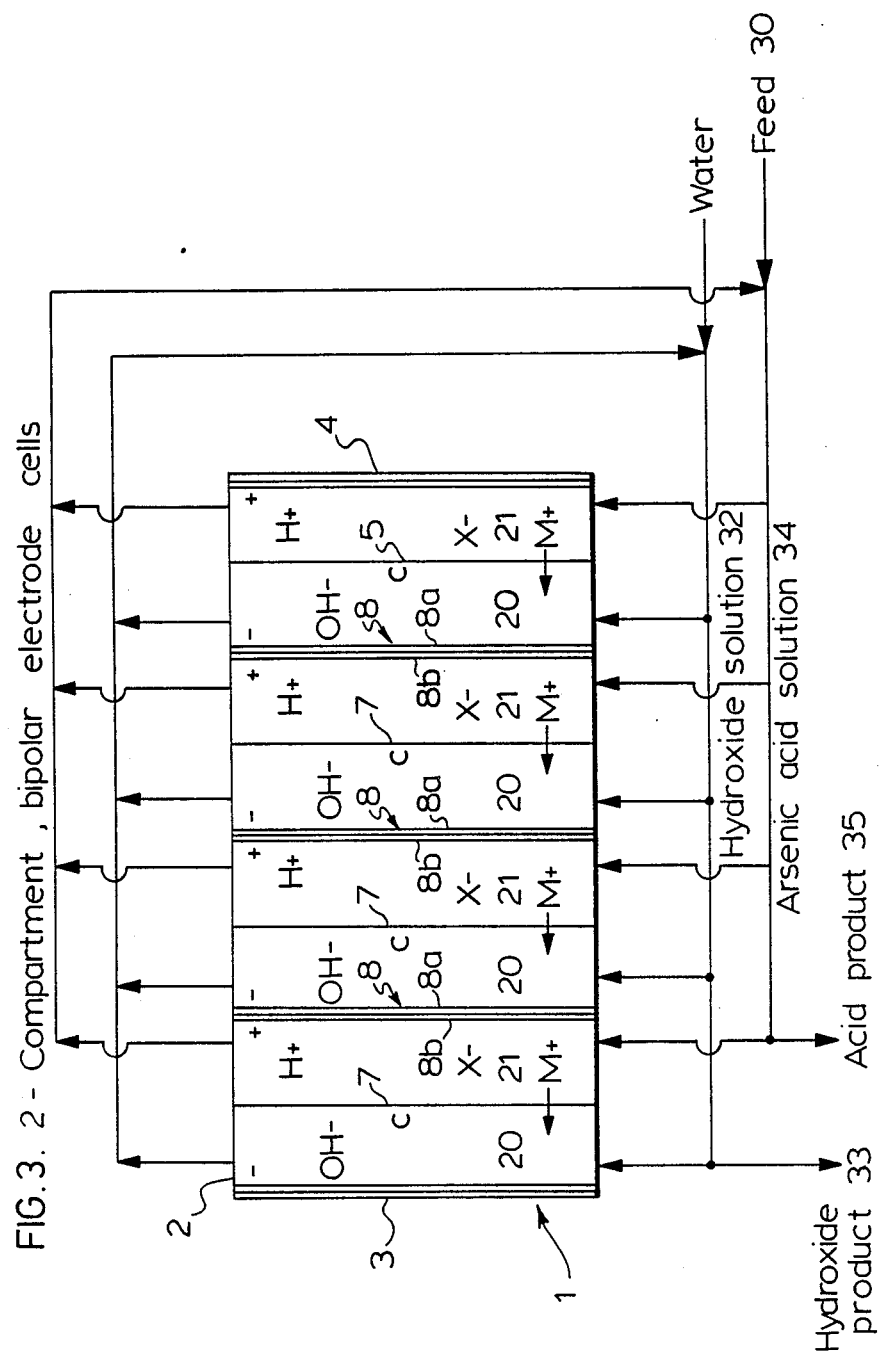
FIG.3. 2 - Compartment, bipolar electrode cells

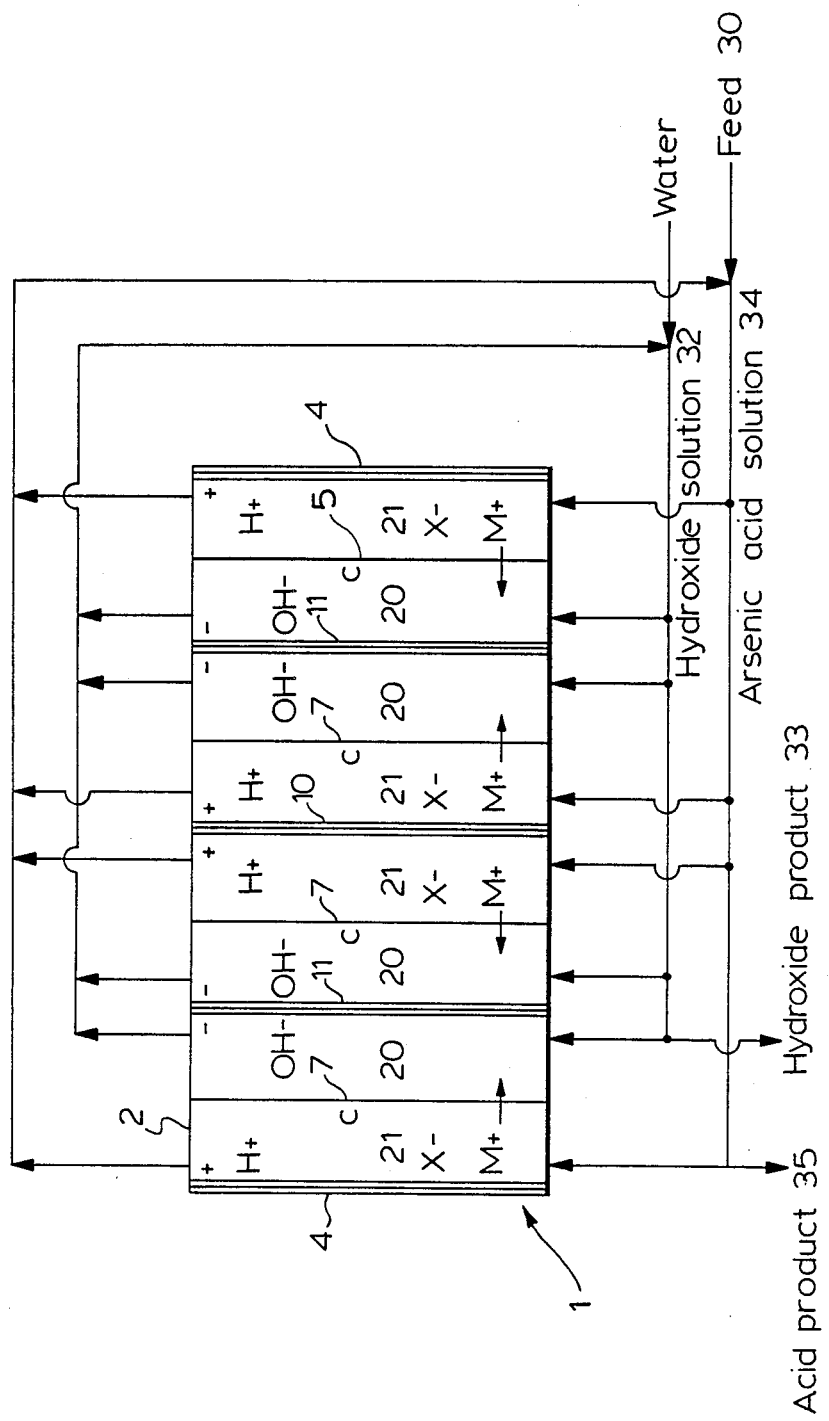
FIG. 4. 2-Compartment, monopolar electrode cells.

METHOD FOR MAKING ARSENIC ACID

This invention relates to a method for making arsenic acid, and, more particularly, to a method for making arsenic acid from soluble arsenate salts using electrolysis with membranes.

BACKGROUND OF THE INVENTION

Arsenic acid can be readily prepared by dissolving arsenic pentoxide in water or by dissolving arsenic trioxide in the presence of an oxidizing agent The oxides of arsenic are often prepared from solutions obtained in the metallurgical treatment processes of arsenical materials such as ores, concentrates, fumes, speisses, slags, residues, flue dusts and the like Depending on the arsenical material being treated, these processes often include a leach with a lixiviant yielding a solution that contains arsenic in the form of an arsenite or arsenate. The leach may be carried out at atmospheric pressure, elevated pressures, at elevated temperatures and, in many cases, in the presence of an oxygen-containing gas. Concurrent with the leaching of arsenic, other metals are dissolved that contaminate the solution and, ultimately, also contaminate the arsenic product prepared from such a solution In many cases, the arsenic-containing solution is treated for the formation of arsenic compounds that may be disposed in an acceptable form.

The leaching of arsenical materials, the oxidation of trivalent to pentavalent arsenic and the preparation of arsenic compounds are well documented. The prior art, however, is silent on the process according to the present invention according to which arsenic acid is prepared from a soluble arsenate salt solution by electrolysis with membranes.

SUMMARY OF THE INVENTION

I have now discovered that an impure water-soluble arsenate salt can be treated for at least partial conversion to arsenic acid More specifically, I have discovered that by subjecting a soluble arsenate salt solution to electrolysis in a cell containing an arrangement of electrodes and cationic membranes or electrodes and cationic and anionic membranes, arsenic acid and a hydroxide may be formed and recovered. The soluble arsenate salt solution may contain arsenic as sodium, potassium, lithium or ammonium arsenate. Depending on the configuration of the cell, arsenic acid containing substantially none to a reduced amount of sodium, potassium, lithium or ammonium and impurities may be recovered. The arsenate salt solution may be a leach solution containing arsenate or arsenite, the latter being easily oxidized to arsenate prior to electrolysis. Most commonly, the arsenate solution contains sodium arsenate The arsenic acid-containing solution that is recovered can be used in the manufacture of arsenic compounds having a reduced impurity content The hydroxide-containing solution, i.e., concurrently generated sodium, potassium, lithium or ammonium hydroxide, is also recovered, and can be recycled to replace at least a portion of any hydroxide input required for generating the soluble arsenate.

Generally, electrolysis is carried out in an electrolysis unit that comprises a stack of two- or three-compartment cells. The unit may comprise at least one electrode/membrane group consisting of either a bipolar or a monopolar electrode in combination with either cationic or cationic and anionic membranes. The at least one electrode/membrane group is arranged between two terminal electrodes with or without adjacent terminal membranes. Hydroxide and acid compartments are defined between electrodes and membranes, and diluate compartments may be defined between membranes. Thus, there are four configurations of the electrolysis cell that can be used in the present invention: a three-compartment, bipolar electrode cell, a three-compartment, monopolar electrode cell; a two-compartment, bipolar electrode cell, and a two-compartment, monopolar electrode cell.

When using a particular configuration for a cell, aqueous arsenate salt solution is fed into diluate or acid compartments of an electrolysis unit while a direct electric current is applied between either the terminal or all electrodes. The application of current causes at least a portion of the arsenate anions to pass through any anionic membranes to concentrate in acid compartments where oxygen is evolved at the anodic electrode surfaces resulting in the formation of arsenic acid. Simultaneously, at least a portion of the alkali metal and ammonium cations pass through any cationic membranes to concentrate in the hydroxide compartments where hydrogen is evolved at the cathodic electrode surfaces resulting in the formation of alkali metal hydroxide or ammonium hydroxide. By selecting monovalent permselective cationic membranes, the passage of any present di- and multi-valent cations to the hydroxide compartments is minimized. Solutions are circulated through the compartments in an electrolytic cell, and arsenic acid with a reduced concentration of monovalent alkali metal and ammonium cations, and substantially pure hydroxide are withdrawn as products.

It is an object of the present invention to provide a method for making arsenic acid. It is another object to provide a method for converting at least a portion of a soluble arsenate to arsenic acid and a hydroxide by electrolysis with membranes. It is a further object to provide a method for treating metallurgical leach solutions containing arsenic by electrolysis with membranes for the recovery of arsenic acid and a hydroxide. These and other objects of the present invention will become clear from the following detailed description.

Accordingly, there is provided a method for the production of arsenic acid which comprises the steps of passing an aqueous solution of an arsenate salt through cells of an electrolysis unit containing electrodes and membranes, said unit comprising terminal electrodes and at least one electrode/membrane group arranged between said terminal electrodes, each said group consisting of at least one membrane adjacent an intermediate electrode; at least defining a hydroxide compartment between membranes and said electrodes; applying an electrical current between said electrodes at a value such that the value of the corresponding current density is in the range of about 10 to 4,500 A/m2; passing flows of solutions through said cells; forming hydroxide-containing solution in said hydroxide compartment; forming arsenic acid-containing solution in said acid compartment; withdrawing hydroxide-containing solution from said hydroxide compartment; withdrawing arsenic acid-containing solution from said acid compartment; and recovering hydroxide solution and arsenic acid-containing solution.

BRIEF DESCRIPTION OF DRAWINGS

The invention will now be described with reference to the accompanying drawings wherein FIG. 1 is a schematic of a first configuration of an electrolysis with membranes unit used in the method of the invention;

FIG. 2 is an alternative of the schematic of FIG. 1;

FIG. 3 is a second alternative of the schematic of FIG. 1;

FIG. 4 is a third alternative of the schematic of FIG. 1; and wherein

M+ is a monovalent cation (K+, Na+, Li+ or NH4+)
X− is an anion (AsO4³−, HAsO4²− or H2AsO4−)
H+ is a hydrogen ion,
OH− is a hydroxyl anion,
c is a cationic membrane,
a is an anionic membrane,
− is a cathode or a cathodic surface, and
+ is an anode or an anodic surface. p In the Figures and the following detailed description, like numbers refer to like parts.

DETAILED DESCRIPTION

The method of the present invention is applicable to aqueous solutions containing water-soluble arsenate salts, as well as water-soluble arsenite salts that have been oxidized to the arsenate form. The water-soluble arsenites and arsenates are those containing monovalent cations such as sodium, potassium, lithium and ammonium The method is particularly applicable to aqueous arsenate salt-containing solutions derived from the metallurgical processing of arsenic-containing materials, arsenical products and intermediates capable of forming soluble arsenates and arsenites. The treatment of specific interest is that in which a leach of arsenical material is carried out under alkaline conditions to yield a solution containing arsenites and/or arsenates as well as dissolved impurity cations, such as for example Zn, Pb, Sb, Ni, Co, and Fe Any arsenite in solution is oxidized to arsenate prior to subsequent treatment of the solution by any one of a number of well-known methods The arsenate solution may contain a mixture of mono-, di-, and tri-alkali metal or ammonium arsenates. Usually, the arsenate solution treated according to the method of the present invention is a sodium arsenate solution, also containing impurity cations The arsenate solution is fed to an electrolysis cell with membranes wherein the arsenate is partly or completely converted into arsenic acid and a hydroxide according to the following simplified equations for a tri-metal arsenate

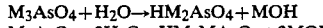
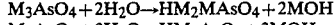
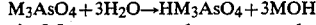

wherein M represents the monovalent cation of sodium, potassium, lithium or ammonium Any mono- or di-hydrogen arsenate reacts similarly.

Electrolysis with membranes may yield an arsenic acid solution that contains substantially none of the monovalent cations and is also substantially free of impurity cations. Electrolysis with membranes may also yield a solution containing arsenic acid and a reduced content of the monovalent cation and impurities. The proportion of arsenic acid in the arsenic acid product solution depends on the electrode/membrane configuration of the electrolysis cell, to be explained.

The electrolysis of aqueous arsenate salt solution is carried out by passing arsenate solution to cells of an electrolysis unit containing electrodes and membranes. The electrolysis unit comprises terminal electrodes and at least one electrode/membrane group arranged between the terminal electrodes. Each electrode/membrane group consists of one membrane or two membranes adjacent an intermediate electrode. At least a hydroxide compartment and an acid compartment are defined between membranes and the electrodes. A diluate compartment may be defined between membranes. The intermediate electrode of an electrode/membrane group may be either a bipolar or a monopolar electrode. The membranes may be suitable cationic membranes or suitable cationic and anionic membranes. A direct electrical current is applied between either the terminal electrodes or between all electrodes in an electrolysis cell. Hydroxide-containing solution is formed in a hydroxide compartment and arsenic acid-containing solution is formed in an acid compartment Hydroxide-containing solution and arsenic acid-containing solution are circulated through their respective compartments and portions are withdrawn from the circulating solutions as products The specific electrode and membrane configuration and type used in an electrolytic cell depend on the desired degree of purity of the arsenic acid product Four possible configurations of an electrolysis unit employing different electrode and membrane configurations and types are described in detail with reference to FIGS. 1, 2, 3 and 4. The figures show electrolysis units each having four cells.

With reference to FIG. 1, the electrolysis unit generally indicated with 1, comprises 3-compartment bipolar electrode cells. The unit comprises a housing 2 containing a terminal cathode 3 and a terminal anode 4 positioned at opposite ends of housing 2. The terminal electrodes 3 and 4 are connected to a source (not shown) of direct electrical current The terminal anode 4 is made of an acid-resistant material such as, for example, lead, lead alloys of silver, antimony or calcium, platinum or platinum-coated, iridium or iridium oxide-coated valve metals. The terminal cathode 3 is made of an alkali-resistant material such as, for example, copper, lead, nickel, iron, steel, tin, silver, graphite, gold, platinum, palladium or platinum-plated titanium, iridium or iridium oxide, zirconium or niobium, or alloys of lead or nickel Adjacent and closely spaced from cathode 3 and anode 4 are a terminal cationic membrane 5 and a terminal anionic membrane 6, respectively Between terminal membranes 5 and 6 is positioned, in closely spaced relation, at least one electrode/membrane group. Preferably a plurality of electrode/membrane groups is used (three are shown). Each electrode/membrane group consists of a cationic membrane 7, an intermediate electrode, i.e., a bipolar electrode 8 having a cathodic side 8a and an anodic side 8b, and an anionic membrane 9, in that order. The number of electrode/membrane groups depends on the desired capacity of the cell and may be limited by desired and practical cell voltages, and by optimum cell design for performance efficiency. The electrode/membrane groups and the terminal membranes and terminal electrodes may form a stack in housing 2. A hydroxide compartment 20 is defined between each of the cationic membranes 7 and the cathodic sides 8a of bipolar electrodes 8, as well as between terminal cathode 3 and terminal cationic membrane 5. An acid compartment 21 is defined between each of the anionic membranes 9 and the anodic sides 8b of bipolar electrodes 8, as well as between terminal anode 4 and terminal anionic membrane 6. A diluate compartment 22 is defined between each of the cationic membranes 7 and the anionic membranes 9, as well as between the terminal membranes 5 and 6 and the adjacent anionic membrane 9 and the adjacent cationic membrane 7, respectively.

The cationic membranes 5 and 7 are suitable monovalent cation permselective membranes such as those that have, for example, strongly acidic active groups and a membrane matrix of a styrene di-vinyl benzene copolymer on a polyvinyl chloride base, the active groups being sulfonic acid radicals ($R-SO_3H$). Suitable cationic membranes include sulfonated or carboxylated per fluorocarbon membranes. Suitable membranes 5 and 7 are treated SelemionI ™ CMR, Selemion ™ CSV, SelemionI ™ CSR, Selemion ™ CMT and especially, treated Selemion ™ CMF membranes manufactured by the Asahi Glass Company of Japan, and equivalent membranes manufactured by other companies.

Suitable anionic membranes 6 and 9 are those that are permselective for anions, and may include Selemion ™ AMV, Selemion ™ ASR, Selemion ™ AAV and Selemion AMT membranes. Other, similarly suitable anionic membranes may be used to yield the desired result.

Each bipolar electrode 8 has a cathodic side 8a and an anodic side 8b, and is made from a suitable, electrically conductive material or composite that, when the direct current is applied between the terminal electrodes 3 and 4, causes evolution of oxygen at the anodic side 8b and hydrogen at the cathodic side 8a. Suitable materials for the bipolar electrodes comprise, for example, metals such as lead, alloys such as antimony-lead, silver-lead or calcium-lead; and composites such as titanium coated with a noble metal, or a metal with a cathodic side of, for example, nickel and an anodic side of platinum, or platinum-plated niobium, tantalum, titanium or zirconium, iridium or iridium oxide-coated titanium or a bimetallic electrode with a cathodic side of steel and an anodic side of any of the suitable anodes listed above With reference to FIG. 2, the electrolysis unit comprises 3-compartment, monopolar electrode cells similar to the cell described with reference to FIG. 1, but wherein the bipolar electrodes have been replaced with monopolar electrodes, and the sequence of membranes has been changed. The cell, generally indicated with 1, comprises a housing 2, two terminal anodes 4 placed at opposite ends of housing 2. Adjacent each of the terminal anodes 4 is positioned a terminal anionic membrane 6. Between the membranes 6 are positioned, in closely spaced relation, at least three electrode/membrane groups (as shown) consisting of intermediate electrodes, i.e. anodes 10 alternating with cathodes 11; the anodes and cathodes have two anionic membranes 9 or two cationic membranes 7, one on either side, respectively The number of electrode membrane groups depends on the desired capacity of the unit. The anodes 10 alternating with cathodes 11 are arranged between the terminal anodes 4 such that a cationic membrane 7 is adjacent a terminal anionic membrane 6. Terminal anodes 4, anodes 10 and cathodes 11 are all connected to a source of direct electrical current (not shown). The anodes and cathodes may be made of the same materials as recited for the terminal electrodes in the description of the unit of FIG. 1. The cationic membranes are suitable monovalent cation permselective membranes. The suitable cationic and anionic membranes may be the same as those recited in the description of the unit of FIG. 1.

A hydroxide compartment 20 is defined between each cationic membrane 7 and a cathode 11. An acid compartment 21 is defined between each anionic membrane 9 and anode 10 and between each terminal anionic membrane 6 and a terminal anode 4. A diluate compartment 22 is defined between a cationic membrane 7 and an anionic membrane 9 and between a cationic membrane 7 and a terminal anionic membrane 6.

In various alternative embodiments (not shown) of the unit according to FIG. 2, the unit may, for example, have terminal cathodes 3 with adjacent terminal cationic membranes 5. The smallest 3-compartment cell unit possible may consist of a cathode and an anode with a cationic and an anionic membrane between the electrodes The operations of a unit according to FIG. 1 or FIG. 2 are similar. Soluble arsenate solution 30, which must be essentially free of solids, is fed to a flow of diluate recirculating through diluate compartments 22 of unit 1. A portion of the circulating diluate may be removed from the process as depleted diluate 31. A direct electrical current is applied between either the terminal electrodes or all anodes and cathodes in the unit, as applicable. The monovalent cations from the arsenate solution pass through the cationic membranes, and concentrate as hydroxide in hydroxide compartments 20. The hydroxide solution 32 is passed and recirculated through the hydroxide compartments 20, and a portion is removed and recovered as hydroxide product 33. The arsenate ions pass through the anionic membranes and concentrate as arsenic acid in acid compartments 21. The arsenic acid solution 34 is passed and recirculated through compartments 21, and a portion is recovered as arsenic acid product 35. Water may be added to the acid compartments 21 and/or hydroxide compartments 20, as necessary, and is conveniently added to circulating solution 32 and/or 34, to give the desired acid or hydroxide concentrations in the products 35 and 33, respectively. Instead of water, depleted diluate 31 may be added to acid compartments 21.

With reference to FIG. 3, the electrolysis unit comprises 2-compartment, bipolar electrode cells similar to the cells described with reference to FIG. 1 but wherein the anionic membranes have been deleted The unit, generally indicated with 1, comprises a housing 2, a terminal cathode 3 and a terminal anode 4 placed at opposite ends of housing 2, and at least one electrode/membrane group. Each electrode/membrane group consists of a cationic membrane 7 and an intermediate electrode, i.e., a bipolar electrode 8 having a cathodic side 8a and an anodic side 8b. A terminal (additional) cationic membrane 5 is positioned between terminal anode 4 and the cathodic side 8a of the adjacent bipolar electrode 8. The number of electrode membrane groups depends on the desired capacity of the cell. A hydroxide compartment 20 is defined between cationic membrane 7 and cathodic side 8a of a bipolar electrode 8, between a cationic membrane 7 and terminal cathode 3, and between terminal cationic membrane 5 and the cathodic side 8a of adjacent bipolar electrode 8. An acid compartment 21 is formed between each cationic membrane 7 and the anodic side 8b of a bipolar electrode 8 and between terminal cationic membrane 5 and terminal anode 4.

The terminal electrodes 3 and 4 and the bipolar electrodes 8 may be made of the same materials as those of the unit described with reference to FIG. 1. The cationic membranes 7 and 5 are monovalent cation permselective membranes, which may be chosen from those described for use in the unit of FIG. 1.

With reference to FIG. 4, the electrolysis unit comprises 2-compartment, monopolar electrode cells similar to the cells described with reference to FIG. 3 but wherein the bipolar electrodes have been replaced with monopolar electrodes. The unit, generally indicated with 1, comprises a housing 2, two terminal anodes 4 positioned at opposite ends of housing 2 and a number of electrode/membrane groups. Each group consists of a cationic membrane 7 and an intermediate electrode. Intermediate electrodes are anodes 10 alternating with cathodes 11, cathodes being adjacent the terminal anodes 4. A terminal cationic membrane 5 is positioned between one of the terminal anodes 4 and its adjacent cathode 11. Thus, a unit according to FIG. 4 contains alternating anodes and cathodes with cationic membranes positioned between the electrodes. A hydroxide compartment 20 is formed between cationic membrane 5 and 7 and a cathode 11. An acid compartment 21 is formed between a cationic membrane 7 and an anode 10, and between membranes 5 and 7 and a terminal anode 4. The anodes and cathodes may be made of the same material as recited in the description of the cell of FIG. 1. The cationic membranes are suitable monovalent cation permselective membranes such as those described in the description of the cell of FIG. 1.

In various alternative embodiments (not shown) of the unit according to FIG. 4, the unit may, for example, have terminal cathodes with alternating anode and cathode intermediate electrodes, anodes being adjacent the terminal cathodes, and cationic membranes between all electrodes. The 2-compartment cell unit may also consist of one cathode and one anode with one cationic membrane, or of two terminal electrodes (cathodes or anodes), an anode or a cathode as intermediate electrode as applicable, with cationic membranes between all electrodes.

The operations of a unit according to FIGS. 3 or 4 are similar. Soluble arsenate solution 30 is fed into an arsenic acid-containing solution 34 that is formed in and is passed and recirculated through acid compartments 21. A direct electrical current is applied to either the terminal electrodes or to all anodes and cathodes, as applicable, and electrolysis takes place. Monovalent cations from the arsenate solution pass through the cationic membranes, and form a hydroxide solution 32 in hydroxide compartments 20. Hydroxide solution 32 is passed and recirculated through hydroxide compartments 20, and a portion is removed and recovered as hydroxide product 33. Water may be added to the circulating hydroxide solution 32 as required to give the desired hydroxide concentration in product 33. Arsenate ions substantially remain in acid compartments 21 and form arsenic acid, and the arsenic acid-containing solution 34 is recirculated, a portion of the circulating solution being removed as acid product 35.

The electrolysis using any one of the above-described cell configurations is carried out at temperatures in the range of from just above the freezing temperature of solution to as high as 60° C., and preferably, at temperatures in the range of from ambient to about 50° C. The electrical current applied between the terminal electrodes or all electrodes may be equivalent to a current density in the range of about 10 to 4,500 A/m$^2$. 4,500 A/m$^2$ is a practical upper limit, as higher values result in excessive heat generation. Below 10 A/m$^2$ the rate of electrolysis is too low. The current density values may be constant or varied, depending on whether the arsenate solution is treated batchwise or in a continuous operation. The current density is preferably chosen in the range of about 200 to 4,000 A/m$^2$. Above about 500 A/m$^2$, cooling of one or more of the circulating solutions may be necessary. The lower values of the current density may be selected to achieve lower cation concentration in the arsenic acid-containing solution that can be recovered from a 2-compartment configuration. The flows through the diluate, acid and hydroxide compartments should be substantially balanced to avoid damage to the membranes due to excessive differential pressure. Damage is avoided when the flow rates are adjusted such that the differential pressure across the membranes does not exceed about 150 kPa. The acid and hydroxide streams may be self circulating aided by the gas evolution. The feed rate of the feed solution may be selected such that the equivalent amount of arsenic in the feed is in the range of about 2 to 60 g/min.m$^2$ of membrane area. The value selected is dependent on the value of the current density and the desired degree of conversion of the arsenate to arsenic acid and hydroxide.

Depending on the configuration of the electrolysis unit the arsenic acid product is substantially free of metal cations or ammonium ions. The units of the configurations described with reference to FIGS. 1 and 2 (3-compartment cells) may give substantially pure products, the arsenic acid product 35 containing substantially no monovalent cations, typically less than 1 g/L, from the arsenate in the feed solution 30. Less than complete conversion may still yield a pure arsenic acid-containing solution. The impurity content is also substantially reduced. The units of the configurations of FIGS. 3 and 4 (2-compartment cells) give usually only partly pure products, and the arsenic acid-containing product 35 contains monovalent cations in a concentration reduced from that in the feed 30. Thus, for example, the acid product 35 may contain a concentration of monovalent cations in the range of about 0.1 to 50 g/L, when treating feed solutions containing about 30 to 100 g/L of monovalent cations. The impurity content is also reduced. The configurations of the units using bipolar electrodes operate at a lower current and at a higher potential at the current rectifier, and with a potentially higher efficiency than the configurations with monopolar electrodes.

The performance of a three-compartment electrolysis cell unit may be improved by maintaining the concentration of the arsenate in the diluate compartment(s) 22 of a cell at a relatively high value. When the concentrations are maintained at a relatively high value such as for example, 30 g/L or higher, i.e., are not allowed to decrease substantially below that value, the unit may be operated at a substantially constant high current density of above about 2000 A/m$^2$, the current density need not decrease during operation and provides high current efficiencies. High concentrations may be maintained by a number of methods that include electrodialysis, crystallization, evaporations or other suitable methods. When using electrodialysis, a flow from the solution circulating through diluate compartment(s) 22 of an electrolysis unit is passed through an electrodialysis unit for concentration, and the concentrated solution is returned to the circulating solution. When using crystallization, the feed solution is subjected to crystallization by a known method. The mother liquor from the crystallization is fed to diluate compartment(s) 22 of the electrolysis unit 1.

The crystals are retained and are dissolved at a controlled rate in circulating diluate of the electrolysis unit, thereby replenishing the arsenate tenor and maintaining it at an adequately high value.

It is understood that concentration not only increases performance but also allows treatment of dilute arsenate solutions.

The invention will now be illustrated by means of the following non-limitative examples

EXAMPLE 1

An electrolysis unit comprising three, three-compartment cells with bipolar electrodes was used for electrolysis of an impure sodium arsenate solution. The electrodes including the terminal electrodes were made of silver-lead alloys The electrode-membrane arrangement was as shown in FIG. 1.

Selemion TM CMR cationic membranes and Selemion TM AMV anionic membranes were used. In a first test, 8 L of the sodium arsenate solution was circulated through the diluate compartments, and water was initially circulated through the acid and the hydroxide compartments at a velocity of 0.5 cm/s. The current was gradually increased to obtain 225 A/m$^2$ through the cells.

Oxygen and hydrogen were evolved at the anode and cathode respectively. Samples were taken from the three circulation streams and analysed. The results are shown in Table I.

TABLE I

| Stream | Time h | As g/L | Na g/L | NaOH g/L | H$_3$AsO$_4$ g/L | Pb g/L |
|---|---|---|---|---|---|---|
| Feed/Diluate | 0 | 53 | 61 | 21 | 0 | 0.41 |
| Acid/Anolyte | 0 | 0 | 0 | 0 | 0 | 0 |
| Hydroxide/Catholyte | 0 | 0 | 0 | 0 | 0 | 0 |
| Diluate | 7 | 49 | 50 | — | — | 0.22 |
| Acid/Anolyte | 7 | 16 | 0.02 | — | 30.5 | 0.04 |
| Hydroxide/Catholyte | 7 | 0.005 | 16.8 | 31 | — | 0.001 |
| Diluate | 55 | 52 | 0.8 | — | 98 | 0.05 |
| Acid | 55 | 51 | 0.1 | — | 97.5 | 0.14 |
| Hydroxide | 55 | 0.1 | 60 | 108 | — | 0.003 |

The feed/diluate circulation decreased in volume by 2.8 L over the 55 hours, with 2.6 L being gained in the catholyte and 0.2 L in the anolyte. Back-diffusion of arsenic acid to the diluate stream from the acid stream was apparent as the acid concentration increased.

Cathiodic and anodic current efficiencies were 92% and 100% respectively, after 7 hours and 50% and 33%*, respectively after 55 hours of operation.

*A value of 65% is obtained if acid in diluate was considered.

Some white Pb-containing solids formed in the diluate recirculation, due to precipitation of the original Pb content in the feed with the decrease in pH. Some corrosion of the lead electrodes was observed; and was particularly severe on the cathodic surfaces.

In a second test, the acid and hydroxide circulation streams were initially made-up using diluted products from the first test. Starting circulating solutions were 8 L for the diluate compartments, and 5.5 L each for the acid and hydroxide compartments. The results are shown in Table II.

TABLE II

| Stream | Time h | As g/L | Na g/L | NaOH g/L | H$_3$AsO$_4$ g/L | Pb g/L |
|---|---|---|---|---|---|---|
| Feed | 0 | 47 | 53 | 17 | — | 0.49 |
| Acid/Anolyte | 0 | 9 | 0 | 0 | 17 | 0 |
| Hydroxide/Catholyte | 0 | 0 | 6 | 10 | 0 | 0 |
| Diluate | 68 | 40 | 5 | 0 | 64 | 0.06 |
| Acid product | 68 | 50 | 0.05 | 0 | 99 | 0.005 |
| Hydroxide product | 68 | 0.02 | 62 | 110 | 0 | 0.003 |
| Current efficiency: | | Cathodic: 60.5% | | | | |
| | | Anodic: 38% or | | | | |
| | | 62% considering acid in the diluate. | | | | |

EXAMPLE 2

Four, three-compartment, monopolar electrode cells were used as shown in FIG. 2 with Selemion TM CMF cationic and Selemion TM AAV anionic membranes. The monopolar electrodes consisted of silver-lead alloy anodes and 316 stainless steel cathodes In a first test, a 20 L portion of feed solution was treated over 120 hours at a current density of initially 500 A/m$^2$ but decreased to 250 A/m$^2$ as the sodium concentration in the feed decreased from 46 g/L to 5.6 g/L. The acid and alkali products generated were analyzed and the results are shown:

TABLE III

| Stream | As g/L | Na g/L | NaOH g/L | H$_3$AsO$_4$ g/L | Pb g/L |
|---|---|---|---|---|---|
| Acid Product | 77 | 0.2 | — | 146 | 0.02 |
| Alkali Product | 0.1 | 114 | 200 | — | <0.001 |
| Dilute | 31 | 5.6 | — | 47 | 0.005 |
| Current efficiency: | Cathodic - 45% | | | | |
| | Anodic - 48% | | | | |

White Pb-containing solids formed in the diluate circulation stream due to precipitation of the original lead content in the feed.

In a second test, starting with 19.5 L of feed solution containing 54 g/L As, 57 g/L Na and 170 mg/L Pb, the hot feed solution was cooled from 80° C. to 30° C., whereupon some sodium arsenate crystals formed in the feed tank. The feed solution was circulated through the middle compartment of the unit which was operated at 500 A/m$^2$ for 65 hours. The temperature was maintained between 35° and 40° C. by cooling. The current efficiency was found to decrease with time as the sodium and arsenic concentrations in the diluate compartments decreased. The sodium concentrations and cathodic current efficiencies after 48 hours were 29 g/L and 80%, and after 65 hours 21 g/L and 57.5%.

At the 65th hour the circulating strams assayed as shown in Table IV.

TABLE IV

| Stream | As g/L | Na g/L | NaOH g/L | H$_3$AsO$_4$ g/L | Pb g/L |
|---|---|---|---|---|---|
| Diluate | 38 | 21 | — | — | 0.02 |
| Caustic product | 0.1 | 124 | 215 | — | <0.001 |
| Acid product | 62 | — | — | 115 | 0.005 |

EXAMPLE 3

A five-cell, two-compartment bipolar cell unit in stack configuration was assembled with Selemion TM CMF cationic membranes with an effective membrane area of 860 cm$^2$. Bipolar electrodes each with a platinum-coated titanium anodic surface and a stainless steel cathodic surface were employed. The terminal anode was made of platinum-coated titanium and the terminal cathode was made of stainless steel. A number of tests were conducted with a sodium arsenate feed solution that was circulated through the anode compartments. Cartridge filters were provided in the recirculating anolyte stream Both anolyte and catholyte were circulated at a linear velocity of 0.9 cm/s.

The feed solution contained 81 g/L As, 85 g/L Na and 0.78 g/L Pb. Some test parameters and results are tabulated in Table V.

TABLE V

| Test | Current Density A/m$^2$ | Unit Cell Voltage V | Products | As g/L | Na g/L | H$_3$AsO$_4$ g/L | NaOH g/L | Pb g/L |
|---|---|---|---|---|---|---|---|---|
| 1 | 205 | 5 | Acid: | 110 | 4.1 | 200 | — | 0.03 |
|   |     |   | Alkali: | 5 | 74 | — | 126 | 0 |
| 2 | 1000 | 5 | Acid: | 119 | 8.8 | 207 | — | — |
|   |     |   | Alkali: | 6 | 84 | — | 126 | — |
| 3 | 1000 | 4.8 | Acid: | 115 | 14 | 190 | — | 0.03 |
|   |     |   | Alkali: | 2 | 72 | — | 125 | 0.003 |

The results show that, at a constant cell voltage of about 5 V, the possible operating current depended on the sodium concentration in the anolyte (acid product). At 4.1 g/L Na, the unit could be operated at 205 A/m$^2$ and at 8.8 g/L Na at 1,000 A/m$^2$.

The sodium concentration in the anolyte is partly increased by some water loss due to electro-osmosis, but may also be increased by other means (see also the following examples).

EXAMPLE 4

A single three-compartment cell was assembled using a Selemion TM CMF cationic and a Selemion TM AMT anionic membrane, a platinum-coated titanium anode and a stainless steel cathode. A feed solution initially containing 85 g/L Na, 90 g/L As and 0.7 g/L Pb was circulated at a velocity of 0.5 cm/s through the diluate compartment. The current density was 3,000 A/m$^2$. The temperature was maintained at 60° C. by cooling the circulating acid and diluate compartment streams. The acid product was generated at 12.8 L/h.m$^2$ and the alkali product at 13.2 L/h.m$^2$. The composition f the acid and alkali products are shown in Table VI.

TABLE VI

|  | As g/L | Na g/L | NaOH g/L | H$_3$AsO$_4$ g/L | Pb g/L |
|---|---|---|---|---|---|
| Acid product | 56.3 | 0.15 | — | 107 | 0.04 |
| Alkali product | 0.06 | 92.5 | 160 | — | 0 |

With the sodium in the diluate compartment maintained at 50 g/L and As at 60 g/L, due to water loss by electro-osmosis to the acid and hydroxide compartments, anodic and cathodic current efficiencies of 84% and 80.4%, respectively, were achieved. The current efficiencies did not decrease over the 72 hour duration of the test. The cell voltage was measured at 7.7 Volts.

EXAMPLE 5

This example illustrates that maintaining a high concentration of arsenate in the diluate compartments of a three-compartment cell electrolysis unit results in improved performance.

To maintain the high concentration, an electrodialysis unit is positioned in the stream circulating around and through the diluate compartments of the electrolysis unit. The feed solution to the electrolysis unit is first fed to the electroldialysis unit together with the diluate from the electrolysis unit. THe feed solution contains 54 g/L arsenic and 62 g/L sodium and is fed at 1350 mL/h to the diluate compartment of the electrodialysis unit, which also receives the diluate stream from the electrolysis unit. The diluate flow from the electrolysis unit containing 38 g/L As and 36 g/L Na is fed to the electrodialysis at 700 mL/h. The electrodialysis unit contains alternating Selemion TM CMV cationic and Selemion TM AMV anionic membranes with an effective membrane pair surface area of 5350 cm$^2$. The electroldialysis unit is operated at 340 A/m$^2$ and at 50° C. The diluate from the electrodialysis unit contains 20 g/L arsenic and 10 g/L sodium and is removed at 1050 mL/h as effluent.

A concentrate from the electrodialysis unit contains 81 g/L arsenic and 77 g/L sodium and is fed at 1000 mL/h to the electrolysis unit. The electrolysis unit is a three-compartment bipolar unit employing 620 cm$^2$ of effective area of Selemion TM CMF cationic and Selemion TM AMT anionic membranes, and is operated at a cell voltage of 6 V, a constant current density of 2250 A/m$^2$ and at a temperature of 50° C. The alkali product is generated at 154 g/h NaOH and the acid product at 143 g/h H$_3$AsO$_4$.

From the results of the above examples it can be seen that the electrolysis of an arsenate solution by electrolysis with membranes in a two- or three-compartment bipolar or monopolar electrode unit is effective in producing an arsenic acid solution containing low concentrations of sodium and impurities such as lead and producing a hydroxide solution similarly containing, low concentrations of arsenic and impurities such as lead. Best results are obtained with a three-compartment cell unit which yields substantially pure arsenic acid and hydroxide solutions at high current efficiencies.

It is understood that variations and modifications may be made in the embodiments of the invention without departing from the scope and purview of the appended claims.

I claim:

1. A method for the production of arsenic acid which comprises the steps of passing an aqueous solution of an arsenate salt to cells of an electrolysis unit containing electrodes and membranes, said unit comprising terminal electrodes and at least one electrode/membrane group arranged between said terminal electrodes, each said group consisting of at least one membrane adjacent an intermediate electrode; at least defining a hydroxide compartment and an acid compartment between membranes and said electrodes; applying an electrical current between said electrodes at a value such that the value of the corresponding current density is in the range of about 10 to 4,500 A/m$^2$; passing flows of solutions through said cells; forming hydroxide-containing solution in said hydroxide compartment; forming arsenic acid-containing solution in said acid compartment; withdrawing hydroxide-containing solution from said hydroxide compartment; withdrawing arsenic acid-containing solution from said acid compartment; and recovering hydroxide solution and arsenic acid-containing solution.

2. A method as claimed in claim 1, wherein said aqueous solution of an arsenate salt comprises a salt chosen from the group consisting of sodium arsenate, potassium arsenate, lithium arsenate and ammonium arsenate.

3. A method as defined in claim 1, wherein said aqueous solution of an arsenate salt is a solution derived from the metallurgical processing of arsenic-containing materials, arsenical products and intermediates capable of forming soluble arsenates and arsenites.

4. A method as claimed in claim 1, wherein said arsenate salt is sodium arsenate.

5. A method as claimed in claim 1, wherein said current density is in the range of about 200 to 4,000 A/m$^2$, the temperature is in the range of from about ambient to about 60° C., and said flows passed through said cells are substantially balanced at flow rates such that the differential pressure across the membranes does not exceed about 150 kPa.

6. A method as claimed in claim 1, wherein said flows of solutions passing through said hydroxide compartments and said acid compartments are recirculated to their respective compartments.

7. A method as claimed in claim 1, wherein said flows of solutions passing through said hydroxide compartments and said acid compartments are recirculated to their respective compartments, and water is added to either or both of said solutions recirculating through said hydroxide compartments and said acid compartments.

8. A method as claimed in claim 1, wherein said electrolysis unit comprises a terminal cathode and a terminal anode, a terminal monovalent cation permselective membrane arranged adjacent said terminal cathode and a terminal anionic membrane arranged adjacent said terminal anode, at least one electrode/membrane group arranged between said terminal membranes, each group consisting of a monovalent cation permselective membrane, an intermediate bipolar electrode having a cathodic side and an anodic side, and an anionic membrane such that an anionic membrane is adjacent said terminal cationic membrane and a cationic membrane is adjacent said terminal anionic membrane; a hydroxide compartment defined between said cationic membrane and said cathodic side and between said terminal monovalent cation permselective membrane and said terminal cathode, an acid compartment defined between each anionic membrane and said anodic side and between said terminal anionic membrane and said terminal anode, and a diluate compartment defined between each cationic membrane and each anionic membrane; and wherein said electrolysis is carried out by feeding arsenate solution to said diluate compartment; and applying an electrical current between said terminal cathode and said terminal anode at a value such that the value of the corresponding current density is in the range of about 200 to 4,000 A/m$^2$.

9. A method as claimed in claim 1, wherein said electrolysis unit comprises two terminal electrodes, two terminal membranes adjacent each of said terminal electrodes, at least one electrode/membrane group arranged between said terminal membranes, each group consisting of an intermediate monopolar electrode and two adjacent membranes; said terminal electrodes and said intermediate monopolar electrode being chosen from anodes and cathodes; said terminal membranes and said adjacent membranes being chosen from monovalent cation permselective membranes and anionic membranes; said terminal electrodes, said terminal membranes, said intermediate monopolar electrode and said adjacent membranes being arranged in said unit such that an anionic membrane is adjacent an anode, a monovalent cation permselective membrane is adjacent a cathode, a hydroxide compartment is formed between a cathode and a monovalent cation permselective membrane, an acid compartment is formed between an anode and an anionic membrane, and a diluate compartment is formed between an anionic and a monovalent cation permselective membrane; and wherein said electrolysis is carried out by feeding arsenate solution to said diluate compartment; and applying an electrical current between anodes and cathodes at a value such that the corresponding current density is in the range of about 200 to 4,000 A/m$^2$.

10. A method as claimed in claim 1, wherein said electrolysis unit comprises a terminal anode, a terminal monovalent cation permselective membrane adjacent said terminal anode, a terminal cathode, at least one electrode/membrane group arranged between said terminal membrane and said terminal cathode, each group consisting of an intermediate, bipolar electrode having a cathodic side and an anodic side, and a monovalent cation permselective membrane adjacent its anodic side; a hydroxide compartment defined between a cationic membrane and the cathodic side of an intermediate bipolar electrode and between a cationic membrane and said terminal cathode; an acid compartment defined between a cationic membrane and the anodic side of an intermediate bipolar electrode and between a cationic membrane and said terminal anode; and wherein said electrolysis is carried out by feeding arsenate solution to said acid compartment; and applying an electrical current between said terminal anode and said terminal cathode at a value such that the value of the corresponding current density is in the range of about 200 to 4,000 A/m$^2$.

11. A method as claimed in claim 1, wherein said electrolysis unit comprises two terminal electrodes, a terminal monovalent cation permselective membrane, at least one electrode/membrane group arranged between said terminal electrodes each group consisting of an intermediate monopolar electrode and a monovalent cation permselective membrane; said terminal electrodes and said intermediate electrode being chosen from anodes and cathodes; said terminal electrodes, said terminal membrane, said intermediate monopolar electrode and said monovalent cation permselective membrane being arranged in said unit such that cathodes alternate with anodes and monovalent cation permselective membranes are positioned between electrodes, a hydroxide compartment is defined between a membrane and a cathode, and an acid compartment is defined between a membrane and an anode; and wherein said electrolysis is carried out by feeding arsenate solution to the acid compartment; and applying an electrical current between anodes and cathodes at a value such that the corresponding current density is in the range of about 200 to 4,000 A/m$^2$.

12. A method as claimed in claim 8, wherein the concentration of arsenate in said diluate compartment is maintained at a value such that said electrolysis unit may be operated at a substantially constant value of the current density above about 2000 A/m$^2$.

13. A method as claimed in claim 9, wherein the concentration of arsenate in said diluate compartment is maintained at a value such that said electrolysis unit may be operated at a substantially constant value of the current density above about 2000 A/m$^2$.

* * * * *